United States Patent [19]
Fukuda et al.

[11] Patent Number: 5,156,070
[45] Date of Patent: Oct. 20, 1992

[54] VEHICULAR ENGINE AND POWER TRAIN MOUNTING ARRANGEMENT

[75] Inventors: Nobuyoshi Fukuda; Atsuyuki Naka; Junji Osako, all of Kanagawa; Yoshiyuki Ishida, Tokyo; Kiyoshi Sagara, Isehara, all of Japan

[73] Assignee: Nissan Motor Company, Limited, Yokohama, Japan

[21] Appl. No.: 527,395

[22] Filed: May 23, 1990

[30] Foreign Application Priority Data

May 24, 1989 [JP] Japan ................. 1-130393

[51] Int. Cl.5 .............................................. F16H 57/02
[52] U.S. Cl. ................................. 74/606 R; 475/200
[58] Field of Search ............. 475/200, 201; 74/606 R

[56] References Cited

U.S. PATENT DOCUMENTS

| | | | |
|---|---|---|---|
| 3,318,168 | 5/1967 | Castelet | 475/200 X |
| 4,222,569 | 3/1980 | Koivunen et al. | |
| 4,528,870 | 7/1985 | Van Deursen et al. | 475/200 X |
| 4,787,468 | 11/1988 | Kobayashi | 475/200 X |
| 4,920,825 | 5/1990 | Okazaki et al. | 74/606 R |
| 4,938,098 | 7/1990 | Sasaki et al. | 475/200 |

FOREIGN PATENT DOCUMENTS

| | | |
|---|---|---|
| 0196871 | 8/1986 | European Pat. Off. . |
| 0281693 | 9/1988 | European Pat. Off. . |
| 1963019 | 8/1970 | Fed. Rep. of Germany . |
| 1195515 | 11/1959 | France ................. 475/200 |
| 1327773 | 4/1963 | France ................. 475/200 |
| 1520768 | 4/1968 | France ................. 74/606 R |
| 2032160 | 11/1970 | France . |
| 543980 | 12/1973 | Switzerland . |

*Primary Examiner*—Vinh T. Luong
*Attorney, Agent, or Firm*—Pennie & Edmonds

[57] ABSTRACT

A mounting arrangement for an automotive vehicle includes a transverse engine having a crankshaft with an axis of rotation extending transversely to a longitudinal axis of the vehicle, a gear train of a transmission having an axis which extends in parallel with the axis of the engine crankshaft, and a differential gear unit having an axis which extends in parallel to the axes of the engine crankshaft and the transmission gear train. The axis of the engine crankshaft is located rearward of the axis of the transmission gear train and over the axis of the differential gear unit, and the axis of the differential gear unit is located rearward of the axis of the transmission gear train. Further, the engine to lower the engine hood line inclined forward.

4 Claims, 3 Drawing Sheets

VEHICULAR ENGINE AND POWER TRAIN MOUNTING ARRANGEMENT

BACKGROUND OF THE INVENTION

1. Field of the Invention

The present invention relates generally to a mounting arrangement of an engine and an associated power train for an automotive vehicle. More specifically, the present invention relates to a mounting arrangement of a vehicular engine and an associated power train including a transmission and a differential gear unit, wherein the engine, the transmission and the differential gear unit are transversely disposed relative to a longitudinal axis of the vehicle and in parallel with one another.

2. Description of the Background Art

A mounting arrangement for an automotive vehicle with transversly disposed engine, transmission and differential gear unit is known in the art as disclosed, for example, in U.S. Pat. No. 4,223,569.

In the above-noted patent, an engine is disposed at the front of a front wheel drive vehicle with an axis of an engine crankshaft extending transversely to a longitudinal axis of the vehicle. A torque converter is arranged adjacent to the engine with its axis being aligned with the axis of the engine crankshaft for a power transmission therefrom. At the rear of the engine and the torque converter, a gear train of a transmission is disposed with its axis parallel to the axis of the engine crankshaft or the torque converter. An output power of the torque converter is transmitted to an input shaft of the transmission gear train by means of a sprocket-chain connection therebetween. Further, a differential gear unit is disposed adjacent to the transmission gear train with its axis being aligned with the axis of the transmission gear train for a power transmission therefrom.

In the above-noted mounting arrangement, however, since the transmission gear train and the differential gear unit are transversely arranged with their axes being aligned with each other, a degree of freedom for mounting other vehicular components, such as, various components of a suspension system, is so limited in a transverse or width direction of the vehicle.

Further, assuming that the above-noted mounting arrangement is applied to a four wheel drive vehicle, a transfer unit is further disposed adjacent to the differential gear unit with its axis being aligned with the axis of the differential gear unit for a power transmission therefrom. Accordingly, a location of the transfer unit is caused to be offset or deviated laterally from the lateral center of the vehicle. The transfer unit controls a power distribution to be transmitted to rear wheels through a propeller shaft and a rear wheel differential gear unit. The propeller shaft extends axially between the transfer unit and the rear wheel differential gear unit. As a result, the propeller shaft is inevitably offset or deviated laterally from the lateral center of the vehicle, so that no space for a brake pedal is provided at one lateral side of the vehicle due to existence of a floor projection or tunnel for accommodating the offset propeller shaft underneath a vehicle floor. Accordingly, a problem has been raised that the same layout of the foregoing vehicular components can not satisfy both right and left steering wheel vehicles due to no space for the brake pedal at the one lateral side of the vehicle.

On the other hand, if the differential gear unit is disposed at the rear of the transmission gear train so as to arrange the propeller shaft to extend axially at the lateral center of the vehicle, a problem is raised in that a weight distribution to front wheels increases deteriorating controllability of the steering as well as durability of front tires due to an inevitable forward location change of the engine, which is far forward of axes of the front wheels, and due to a corresponding increased front overhang.

Another mounting arrangement has been proposed, wherein the axis of the engine crankshaft is arranged above and forward of the axis of the transmission gear train, and the axis of the differential gear unit is arranged rearward of and level with the axis of the transmission gear train. In this arrangement, however, since the engine is still inevitably located considerably forward of the axes of the front wheels, a corresponding large weight distribution to the front wheels as well as the corresponding increased overhang are resulted. In addition, since the engine is located substantially over the transmission gear train, a higher engine hood line results, narrowing front visibility, and further results in insufficient space for an engine oil pan.

SUMMARY OF THE INVENTION

Therefore, it is an object of the present invention to provide a mounting arrangement of a vehicular engine and an associated power train that can eliminate the above-noted defects inherent in the background art.

It is another object of the present invention to provide a mounting arrangement of a vehicular engine and an associated power train that can increase a degree of freedom for mounting other vehicular components, such as, various components of a suspension system in a transverse or width direction of the vehicle.

It is a further object of the present invention to provide a mounting arrangement of a vehicular engine and an associated power train that, when applied to a four wheel drive vehicle, can prevent a lateral deviation or offset of a location of a propeller shaft from the lateral center of the vehicle.

It is still another object of the present invention to provide a mounting arrangement of a vehicular engine and an associated power train that can minimize a weight distribution to front wheels as well as a front overhang while satisfying other requirements.

It is a still further object of the present invention to provide a mounting arrangement of a vehicular engine and an associated power train that can allow a lower engine hood line while satisfying other requirements.

To accomplish the above-noted and other objects, according to one aspect of the present invention, the present mounting arrangement of an engine, a differential gear unit, and a transmission gear train in an automotive vehicle having a front engine compartment for mounting an engine in front of a passenger compartment comprises a unique arrangement wherein the engine, with a cylinder head, an engine block and a crank shaft having an axis of rotation, is transversely mounted in the front engine compartment so that the crank shaft axis is transverse to a longitudinal axis of the vehicle. The engine is further mounted in the engine compartment so that the engine is inclined about the crank shaft axis so that the cylinder head is in front of the engine block with respect to a forward running direction of the vehicle to obtain a lower engine hood line.

Further, the transmission gear train having an axis of rotation is drivingly connected to the crank shaft with the transmission gear train axis extending in parallel with the crank shaft axis. The transmission gear train axis is arranged so that it falls forward and below the crank shaft axis with respect to the forward running direction of the vehicle.

Moreover, a differential gear unit having an axis of rotation is drivingly connected to the transmission gear train with the differential gear axis also extending in parallel with the crank shaft axis. The differential gear axis is arranged so that it falls rearward and below the crank shaft axis with respect to the forward running direction of the vehicle.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings.

DESCRIPTION OF THE PREFERRED EMBODIMENT

Now, a mounting arrangement of an engine and an associated power train for an automotive vehicle according to a preferred embodiment of the present invention will be described hereinbelow with reference to FIGS. 1 and 2.

Figure 1:
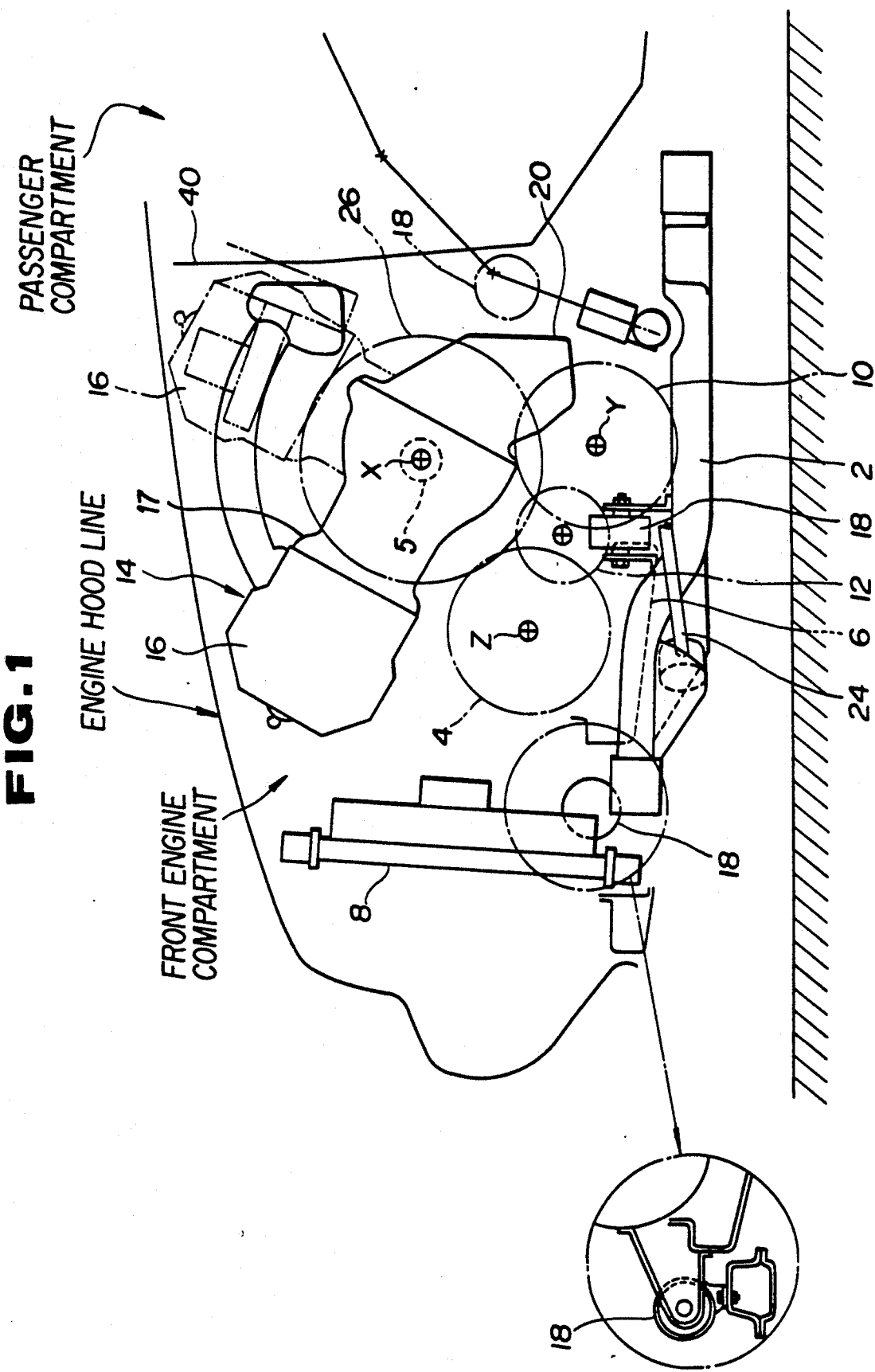
FIG. 1 is a schematic diagram viewed from a left side of a vehicle and showing relative locations of vehicular components according to a preferred embodiment of the present invention.
Figure 2:
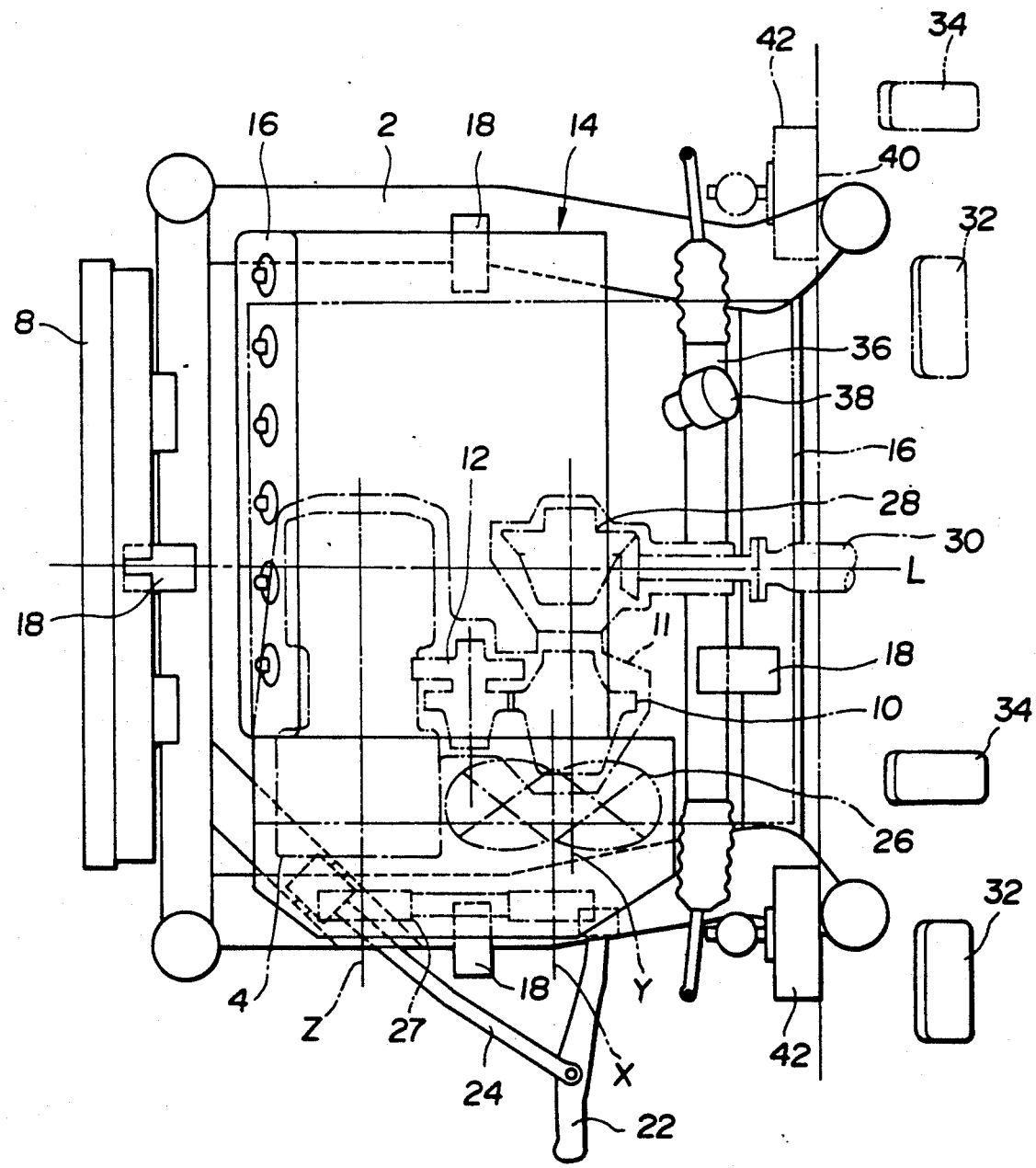
FIG. 2 is a schematic plan view of FIG. 1.

FIGS. 1 and 2 respectively show a front side of a four wheel drive vehicle. At a front and left side of a ladder type sub-frame 2 is mounted a gear train 4 of a transmission with its axis Z extending transversely to a longitudinal axis L of the vehicle, or extending in a width direction of the vehicle. An oil pump 6 is further provided underneath the transmission gear train 4. A reference numeral 8 designates a radiator which is arranged forward of the sub-frame 2.

A differential gear unit 10 is mounted rearward of the transmission gear train 4 at a left side of the vehicle with its axis Y extending in parallel with the axis Z of the transmission gear train 4. The differential gear unit 10 is connected to the transmission gear train 4 through an idler gear unit 12 for a power transmission from the transmission gear train 4.

An engine 14 is disposed with an axis X of an engine crankshaft, graphically shown in FIG. 1 by dotted lines extending in parallel with the axes Y and Z of the respective differential gear unit 10 and transmission gear train 4. The axis X of the engine crankshaft is located rearward of the axis Z of the transmission gear train 4 and above the axis Y of the differential gear unit 10 substantially in a vertical direction. The engine 14 is a six-cylinder in-line type engine with a cylinder head 16 inclined forward and is supported by the sub-frame 2 through four engine mountings 18 one of which is illustrated in detail in FIG. 1, as an example. An engine oil pan 20 is fixed to a slanted rear end or lower end of a cylinder block. Space for the engine oil pan 20 is sufficiently ensured due to the forward inclined arrangement of the engine.

Reference numerals 22 and 24 respectively show a lower link and a tension rod of a suspension unit which is provided at both lateral sides of the sub-frame 2.

A torque converter 26 is provided on the left side of the engine 14 with its axis being aligned with the axis X of the engine crankshaft for a power transmission from the latter. The torque converter 26 and the transmission gear train 4 are connected through, for example, a sprocket-chain connection 27 therebetween.

A transfer unit 28 is further disposed on the right of the differential gear unit 10 with its axis being aligned with the axis Y of the differential gear unit 10 for a power transmission from the latter. The transfer unit 28 controls a power distribution to be transmitted to rear wheels through a propeller shaft 30 and a rear wheel differential gear unit (not shown). As seen from FIG. 2, the propeller shaft 30 extends axially rearward from the transfer unit 28 at the lateral center of the vehicle. Reference numerals 32 and 34 respectively denote a brake pedal and an accelerator pedal, and reference numerals 36 and 38 denote a rack-and-pinion steering gear of a steering mechanism.

In the preferred embodiment as described above, since the axes X, Y and Z of the engine crankshaft, the differential gear unit 10 and the transmission gear train 4 are arranged in parallel with one another, a degree of freedom for the layout in the width direction of the vehicle is increased. Accordingly, the layout of, for example, the lower link 22 and the tension rod 24 of the suspension system becomes more flexible. Further, an engine having a larger number of cylinders, such as, an eight-cylinder in-line type engine can be easily installed.

Further, since the transfer unit 28 can be arranged at the lateral center of the vehicle, the propeller shaft 30 can also be arranged to extend axially rearward from the transfer unit 28 at the lateral center of the vehicle. Accordingly, sufficient space for the brake pedal 32 and the accelerator pedal 34 is ensured at both lateral sides of the vehicle.

Further, since the axis X of the engine crankshaft is located rearward of the axis Z of the transmission gear train 4, a weight distribution to front wheels is made less in comparison with the aforementioned background art to improve controllability of the steering as well as the durability of the front tires.

Still further, the rearward location of the axis X of the engine crankshaft relative to the axis Z of the transmission gear train 4 allows the engine to be inclined forward towards the front overhang, so that a lower engine hood line is successfully attained.

Figure 3:
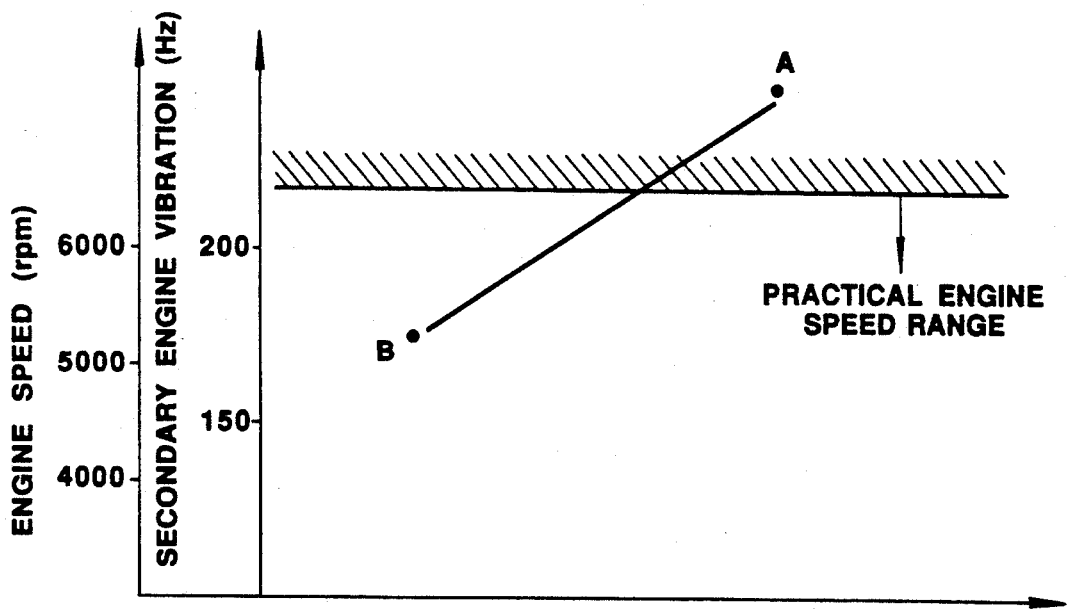
FIG. 3 is a graph showing resonance frequencies derived by the preferred embodiment of FIG. 1 and the background art, relative to engine revolution speed and secondary engine vibration frequency.

Further, since the relative location of the engine 14 as described above as well as the forward inclined arrangement of the engine allow the engine block 17 of the engine 14 to be fixedly connected to a casing of the transmission gear train 4 and to a casing of the differential gear unit 10 in addition to a secure connection to a casing of the torque converter 26, a connection rigidity of the engine 14 with the foregoing associated components becomes large enough to shift a resonance frequency out of a frequency band of a secondary engine vibration derived by a practical engine revolution speed range, which is illustrated in FIG. 3. In FIG. 3, a point A shows a resonance frequency derived in the aforementioned preferred embodiment, and a point B shows a resonance frequency derived in the aforementioned background art in which the axis of the engine crankshaft is arranged above and forward of the axis of the transmission gear train, and the axis of the differential gear unit is arranged rearward of and level with the axis of the transmission gear train. As clearly seen from FIG. 3, the point B of the background art is set within the practical engine revolution speed range, while the point A of the preferred embodiment is set out of the practical engine revolution speed range.

It is to be appreciated that in place of the in-line cylinder type engine, other types of engines, such as, a V-type engine having forward and rearward inclined cylinders may be employed as shown by dotted lines in FIGS. 1. The V-type engine can be installed in the normal posture or in a posture with the forward inclined cylinders more inclined forward or with the rearward inclined cylinders more inclined rearward according to a relative engine layout with other vehicular components.

When the V-type engine is installed in place of the in-line cylinder type engine, though the rearward inclined cylinders 16 inevitably approach close to a dash panel 40, the degree of freedom for the layout in the width direction of the vehicle is sufficiently large as mentioned above to allow the V-type engine to be installed in a predetermined limited lateral space with the cylinders not interfering with a booster of a brake mechanism, such as, a MASTER VAC (a vacuum booster) 42. Accordingly, the engine can be arranged as close to the dash panel 40 as possible to provide the minimum front overhang. Further, the lateral space for the MASTER VAC 42 is sufficiently provided at both lateral sides of the engine 14 to allow either a right or left steering wheel with the same layout of the engine. Still further, assuming that the vehicle is hit from front with the engine displaced rearward, the engine is supported evenly on large dimensions of the dash panel 40 with no interference with the MASTER VAC 42, resulting in minimum deformation of the dash panel 40.

It is to be understood that this invention is not to be limited to the embodiments described above, and that various changes and modifications may be made without departing from the spirit and scope of the invention as defined in the appended claims.

For example, the present invention may also be applicable to a manual transmission vehicle in place of the automatic transmission vehicle as in the preferred embodiment. In this case, the torque converter 26 may be replaced by a manually operated clutch unit. Further, the present invention may also be applicable to a front-engine front-drive vehicle in place of the four wheel drive vehicle as in the preferred embodiment.

What is claimed is:

1. A power train arrangement mounted in front of a passenger compartment of an automotive vehicle comprising:

an engine, with a cylinder head, an engine block and a crank shaft having an axis of rotation, transversely mounted in said front engine compartment so that said crank shaft axis is transverse to a longitudinal axis of the vehicle and said engine is inclined about said crank shaft axis in a forward running direction of the vehicle, disposing said cylinder head forward of said engine block with respect to the forward running direction of the vehicle;

a transmission gear train having an axis of rotation extending in parallel to and drivingly connected to said crank shaft, said transmission gear train axis being disposed forward and below said crank shaft axis with respect to the forward running direction of the vehicle;

a differential gear unit having an axis of rotation also in parallel with said crank shaft and drivingly connected to said transmission gear train, said differential gear axis being disposed rearward and below said crank shaft axis with respect to the forward running direction of the vehicle; and a torque converter drivingly connected to said crank shaft and having an axis of rotation in alignment with said crank shaft axis.

2. A power train arrangement according to claim 1, further comprising:

a sprocket and chain drive drivingly connecting said torque converter to said transmission gear train.

3. A power train arrangement mounted in front of a passenger compartment of an automotive vehicle comprising:

an engine, with a cylinder head, an engine block and a crank shaft having an axis of rotation, transversely mounted in said front engine compartment so that said crank shaft axis is transverse to a longitudinal axis of the vehicle and said engine is inclined about said crank shaft axis in a forward running direction of the vehicle, disposing said cylinder head forward of said engine block with respect to the forward running direction of the vehicle;

a transmission gear train having an axis of rotation extending in parallel to and drivingly connected to said crank shaft, said transmission gear train axis being disposed forward and below said crank shaft axis with respect to the forward running direction of the vehicle;

a differential gear unit having an axis of rotation also in parallel with said crank shaft and drivingly connected to said transmission gear train, said differential gear axis being disposed rearward and below said crank shaft axis with respect to the forward running direction of the vehicle; and a transfer unit drivingly connected to said differential gear unit, said transfer unit having an axis of rotation in alignment with said differential gear unit axis.

4. A power train arrangement according to claim 3, further comprising:

a propeller shaft drivingly connected to said transfer unit and extending rearward from said transfer unit, with respect to the forward running direction of the vehicle.

* * * * *